United States Patent
van Staden

(10) Patent No.: US 8,539,818 B2
(45) Date of Patent: Sep. 24, 2013

(54) METHODS AND SYSTEMS FOR EVAPORATIVE COOLING INFRARED THERMOGRAPHIC LEAK DETECTION

(75) Inventor: Paul van Staden, Queensland (AU)

(73) Assignee: The Boeing Company, Chicago, IL (US)

(*) Notice: Subject to any disclaimer, the term of this patent is extended or adjusted under 35 U.S.C. 154(b) by 126 days.

(21) Appl. No.: 12/697,411

(22) Filed: Feb. 1, 2010

(65) Prior Publication Data
US 2011/0185791 A1   Aug. 4, 2011

(51) Int. Cl.
*G01M 3/04* (2006.01)
(52) U.S. Cl.
USPC ............................................. 73/40; 73/40.7
(58) Field of Classification Search
USPC ............................................................ 73/40.7
See application file for complete search history.

(56) References Cited

U.S. PATENT DOCUMENTS

| | | | | |
|---|---|---|---|---|
| 4,745,797 A * | 5/1988 | Wegrzyn | | 73/40.7 |
| 5,001,346 A * | 3/1991 | Barkhoudarian | | 250/330 |
| 6,401,524 B1 * | 6/2002 | Incavo et al. | | 73/40 |
| 6,866,089 B2 * | 3/2005 | Avila | | 165/11.1 |
| 7,358,860 B2 * | 4/2008 | Germouni et al. | | 340/605 |
| 2005/0126263 A1 * | 6/2005 | Avila | | 73/40 |

FOREIGN PATENT DOCUMENTS
WO   2007132009 A2   11/2007

* cited by examiner

*Primary Examiner* — Hezron E Williams
*Assistant Examiner* — Mark A Shabman
(74) *Attorney, Agent, or Firm* — Armstrong Teasdale LLP

(57) ABSTRACT

A method for leak testing a vessel is described. The method includes providing an environment within the vessel that is at a lower humidity than the environment surrounding the vessel, and using a thermographic imaging system to identify any leaks associated with the vessel. The leaks are identified based on evaporative cooling that occurs when a portion of the lower humidity environment escapes from the vessel and mixes with the higher humidity environment surrounding the vessel.

20 Claims, 6 Drawing Sheets

METHODS AND SYSTEMS FOR EVAPORATIVE COOLING INFRARED THERMOGRAPHIC LEAK DETECTION

BACKGROUND

The field of the disclosure relates generally to leak detection on vessels and tanks, and more specifically, to methods and systems for evaporative cooling infrared thermographic leak detection.

Infrared thermography can be utilized to find leaks in vessels and tanks when the velocity flow through the leakage areas is high enough to impart a temperature change to the surrounding areas. However, in commercial aircraft fuel tank testing, the amounts of pressurization are very low. In these low pressure testing situations, any temperature changes around a leakage area, or in the leakage area itself, may be masked by sealant, the material from which the tank or vessel is built (e.g., aluminum) and the fasteners immediately adjacent to the leak. As a result, in these low velocity areas, infrared thermography on its own is not sufficient to provide a complete solution to leak detection, especially for commercial aircraft fuel tank testing and/or cabin pressurization testing. As a result, traditional leak detection methods using infrared thermography alone are strongly dependant on high velocities at the leakage areas to impart a localized temperature change for detection and high velocities generally require testing under higher pressures.

It is desirable to accomplish leak testing at lower pressures. Therefore, in one current tank testing method, all external seams of the tank are painted with an indicator paint that reacts when in contact with anhydrous ammonia. A fifteen percent anhydrous ammonia/air mixture is then used to pressurize the tanks and any leaks are shown through discoloration of the indicator paint. Leakage areas are then noted and the indicator paint is removed and a repair or refurbishment of the tank is undertaken. In another currently used tank testing method, a five percent helium gas/air mixture is used along with helium detectors to determine the presence of any leakage area associated with the pressurized tank.

One downside to the above described testing methods is the recurring material costs associated with Anhydrous ammonia, helium and the indicators. In the case of anhydrous ammonia, it is also a hazardous substance. The application and removal of the indicator associated with the anhydrous ammonia testing method is an added labor cost as well. Helium is an asphyxiant and side effects are proportional to oxygen displacement. Further, helium detectors do not have the ability to show visualization of leaks but provide only an approximation of where the leaks are.

In contrast to the above leak testing methodologies, evaporative cooling uses the natural relationship between relative humidity, water and air temperature. Relative humidity is defined as the ratio of the actual vapor pressure to the pressure of saturated vapor of air at the prevailing dry bulb temperature. It is thus an indication of the amount of water vapor that can be absorbed by the air until it reaches 100% relative humidity. In the context of evaporative cooling, dehumidified air leaving the one area at a reduced water content (de-humidified to a lower relative humidity value) and moving into an area of higher humidity has the capacity to absorb more water than the surrounding atmosphere thereby producing a localized drop in temperature, and hence the term evaporative cooling.

BRIEF DESCRIPTION

In one aspect, a method for leak testing a vessel is provided. the method includes providing an environment within the vessel that is at a lower humidity than the environment surrounding the vessel, and using a thermographic imaging system to identify any leaks associated with the vessel, based on evaporative cooling that occurs when a portion of the lower humidity environment escapes from the vessel and mixes with the higher humidity environment surrounding the vessel.

In another aspect, a leak testing method is provided that includes pressurizing a vessel to be leak tested with a gas having a humidity less than the gas surrounding the vessel, sensing any temperature drops proximate the vessel caused by localized evaporative cooling of external gas using thermographic imaging, and identifying the temperature drops as leakages associated with the vessel.

In still another aspect, a system for testing a vessel for leakages is provided. The system includes at least one device for providing a humidity differential between an inside of the vessel and the exterior of the vessel and a thermographic imaging system operable to identify any leaks associated with the vessel. The leaks are identifiable with the imaging system based on evaporative cooling that occurs when a portion of the lower humidity environment mixes with the higher humidity environment.

The features, functions, and advantages that have been discussed can be achieved independently in various embodiments or may be combined in yet other embodiments further details of which can be seen with reference to the following description and drawings.

DETAILED DESCRIPTION

The embodiments described herein relate to the detection of leaks within pressurized vessels using infrared thermography to detect areas in which evaporated cooling is occurring. The described embodiments provide a method of leak detection on slightly pressurized vessels/tanks/cabins without the use of hazardous substances or the application of indicators to detect a presence of such substances. The embodiments also address the problems associated with the testing of tanks and vessels that are tested under relatively lower pressures, where the velocity flows emanated from leakage areas are so low that temperature changes are too low for stand alone infrared visualization or in situations where the leakages (and associated temperature changes) are masked and/or absorbed) by sealant, o-rings, or other forms of construction material.

As mentioned above, evaporative cooling uses the natural relationship between relative humidity, water and air temperature and relative humidity is the actual vapor pressure to the pressure of saturated vapor of air at the prevailing dry bulb temperature and is an indication of the amount of water vapor that can be absorbed by the air until it reaches 100% relative humidity.

In the context of an evaporative cooling/thermographic leak process, the air leaving the leakage area at a reduced water content (de-humidified to a lower relative humidity value or expelled into a higher humidity environment) has the capacity to absorb more water than the surrounding atmosphere external to the test piece. At the leakage areas (and external to the article under test) there exists a mixture zone where low relative humidity air passing through the leak area, with a velocity component, is mixed with stationary air of a higher relative humidity value, which causes evaporation of moisture from the stationary air. This localized evaporation of external air imparts a temperature drop proximate the leakage area that can be detected with an infrared camera.

By using de-humidified air to pressurize the test piece (e.g., a fuel tank, aircraft cabin, or other vessel), the dependence on a velocity profile at the leakage area is significantly reduced as well as any influence that may be imparted by the material surrounding the leakage area which would otherwise mask actual leaks. In arid ambient environments, a humidity differential may be accomplished by adding humidity to a suspected leakage area.

Figure 1:
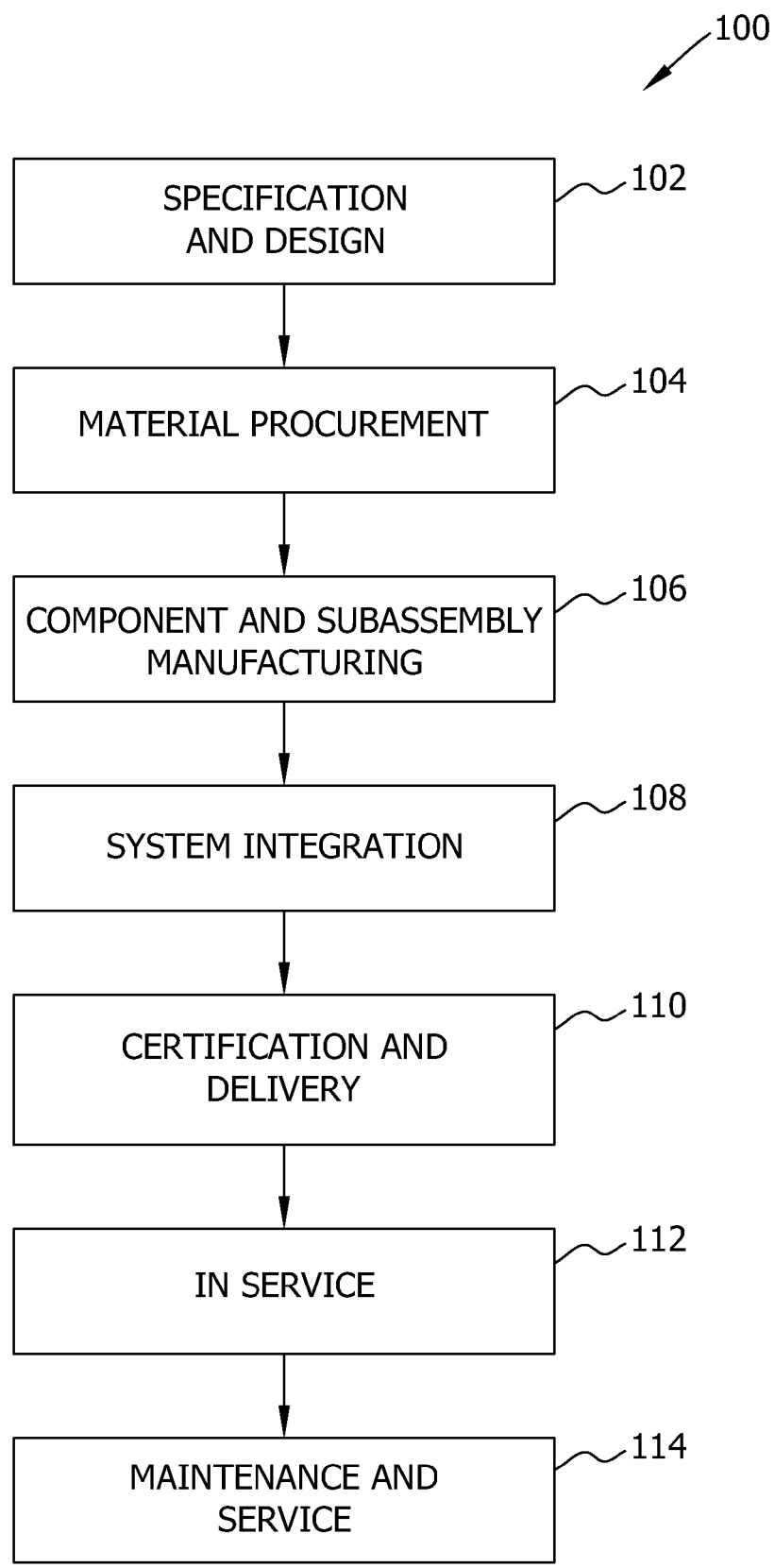
FIG. 1 is a flow diagram of an aircraft production and service methodology.
Figure 2:
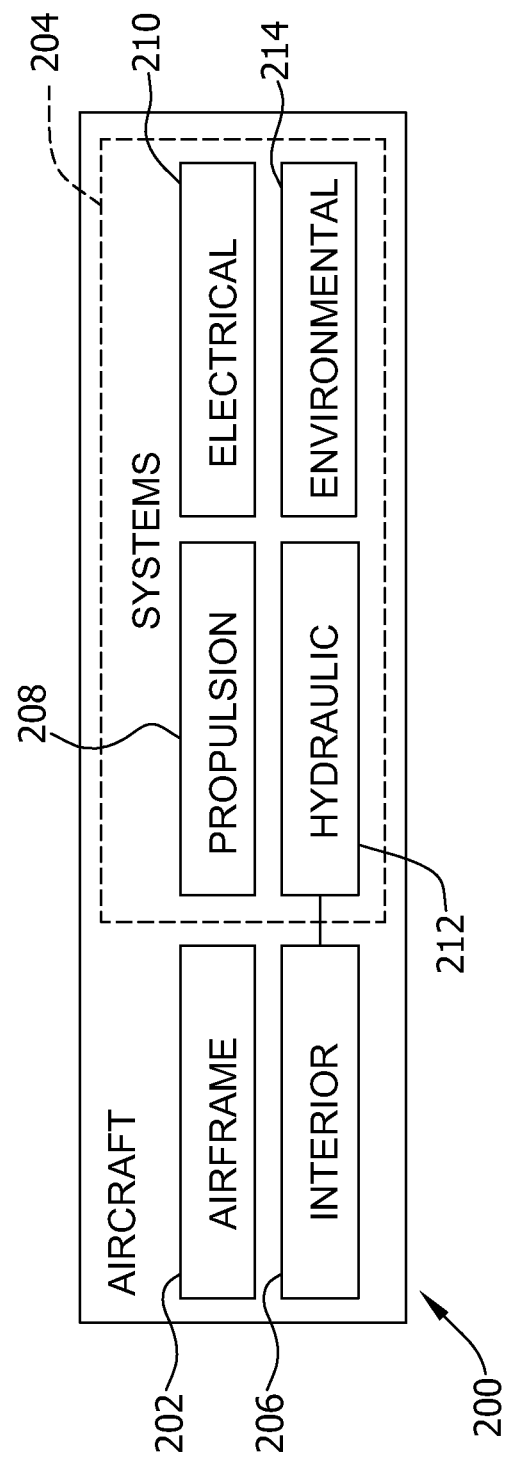
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive, medical, food or petrochemical industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
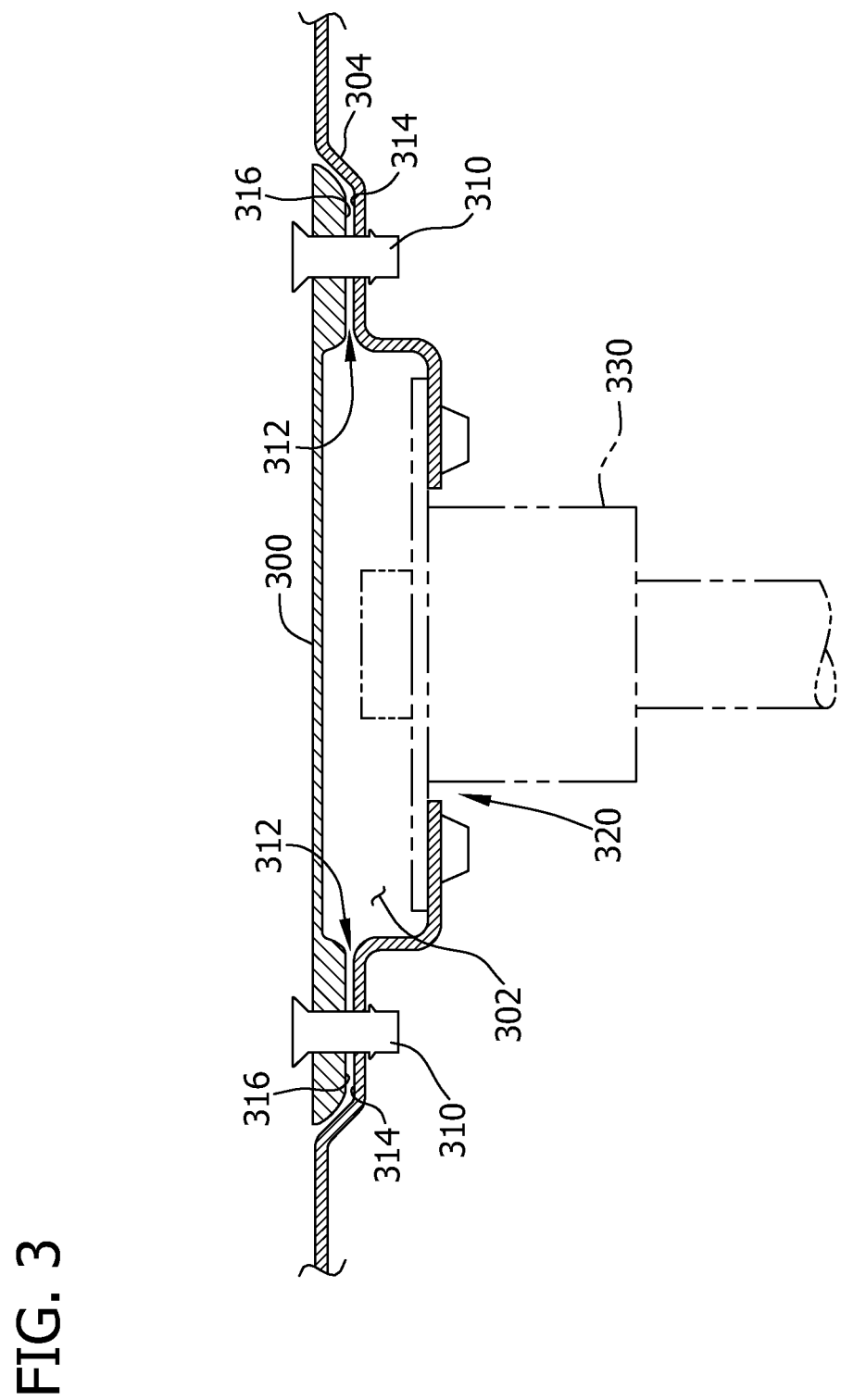
FIG. 3 is a side cross-sectional view of a cover plate that is inserted into an opening in one known fuel tank.

FIG. 3 is a side cross-sectional view of a cover plate 300 that is inserted into an opening 302 in one known fuel tank 304. In complex systems such as aircraft, a fuel tank is not simply a vessel with an opening for fuel insertion and another for fuel consumption. Rather, a fuel tank such as fuel tank 304 may include many openings where cover plates are utilized for the mounting of sensors or other components within the fuel tank. Additionally, certain fuel tanks are physically large in size which dictates that they be fabricated from multiple piece parts that are put together, for example through the use of mechanical fasteners and/or welding. While the cover plates are configured to form a seal between it and the tank under test, seals are known to fail, as are mechanical fasteners. Similarly, a welded area may include one or more voids within the welding zone that negate the sealing effect of welding. These issues dictate that such fuel tanks, as well as other vessels, and even the cabin of some aircraft, undergo leak testing as part of the manufacturing process.

Referring to FIG. 3 again, mechanical fasteners 310 are utilized in an attempt to form a seal between cover plate 300 and fuel tank 304. The opening 302 in the illustrated embodiment is an indented area that is sized for the insertion of the cover plate 300 and defines a sealing area 312 between a surface 314 of the fuel tank 304 and a surface 316 of the cover plate 300. In a practical application, a sealer, an O-ring, or a gasket (neither shown in FIG. 3) is utilized between surfaces 314 and 316. Leaks may occur with sealer and with gaskets. A secondary opening 320 may be included within the fuel tank 304 for the mounting of an instrument 330. Instrument 330 represents any device that may be mounted within an opening on the material that makes up the fuel tank 304.

Figure 4:
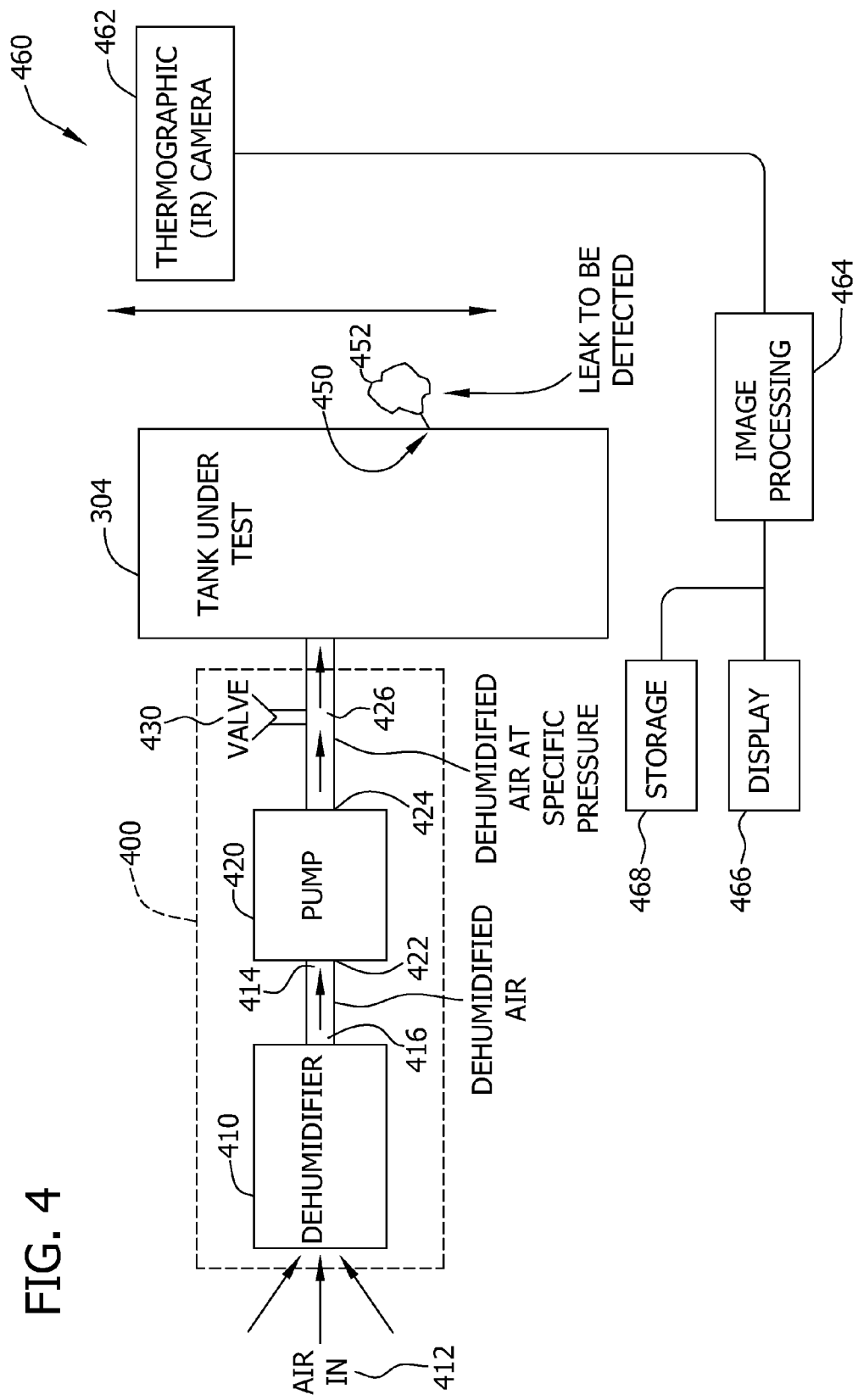
FIG. 4 is a diagram of a system for putting dehumidified air into a tank under test and a thermographic imaging system.

FIG. 4 is a diagram of a system 400 for putting dehumidified air into a tank under test 304. System 400 includes a dehumidifier 410 that receives air 412 from the area surrounding dehumidifier 410, removes moisture from that air, thereby outputting dehumidified air 414 through an output 416 of the dehumidifier 410. As will be understood, during such a process, the ambient air within the tank under test has to be removed over time (e.g., displaced by the lower humidity air), or the air drawn into the dehumidifier 410 can be drawn from the tank 304 resulting in a quasi-closed loop humidity reduction system.

A pump 420 may be included within system 400 to receive the dehumidified air 414 at an input 422 and pump the air through an output 424 of the pump 420 in order to maintain a desired pressure of dehumidified air within the tank 304. In operation, pump 420 supplies dehumidified air at a pressure 426 to tank 304. In embodiments, a valve 430 may be included that operates to maintain a pressure of the dehumidified air within tank 304 without operation of the pump 420 or the dehumidifier 410.

While described herein in terms of reducing the humidity of ambient air for placement within a tank under test, it is recognized that in some low humidity environments, that it is not practical or possible to dehumidify the ambient air. In such environments the described embodiments may be accomplished by increasing the humidity surrounding the tank under test. In some applications this increased humidity may involve nothing more than applying water to the exterior of the tank under test. It will be understood by those skilled in the art that it is the humidity differential and pressure differential between the inside of the tank under test and the outside of the tank under test that provides the capabilities disclosed herein. Therefore in other scenarios, humidity within the tank could be increased over the ambient humidity. In such scenarios, and depending on the tank under test, a vacuum could be pulled on the tank with the infrared imaging system disposed therein. Temperature differentials may also be found when humid air under pressure escapes into an area of lower humidity.

In FIG. 4, tank 304 is illustrated as having a leak 450. As described further in the following paragraphs, the reduced humidity air 452 escaping tank 304 through leak 450 will react with the air surrounding the leak 450 which is at a higher level of humidity.

More specifically, if reduced relative humidity air (dehumidified) is passed through an environment of higher relative humidity external to the leak location, the relative humidity will equalize somewhere between the two humidity values. This reaction imparts a temperature drop within the localized area of the leak 450 as a result of evaporative cooling. As described further within, this evaporation and resulting decrease in temperature is sufficient to indicate leakage areas using infrared thermography, even such leaks are at very low pressure differentials (e.g., 0.25 psi). Such embodiments operate to remove a reliance on actual velocity values of escaping air at leakage areas in order to generate the temperature changes needed for the imaging process as well as masking of leakages that can occur due to absorption by sealants and gaskets.

Referring again to FIG. 4, a thermographic imaging system 460 includes a thermographic (infrared) camera 462, along with and for example, an image processing system 464 and may include one or both of a display 466 and storage 468 for thermographic images. In operation, when thermographic camera 462 is in the vicinity of leak 450, the camera 462 will be able to sense the temperature drop imparted by evaporative cooling as described herein and image processing system 464 operates to provide data compatible for viewing on display 466 and/or for storage within storage 468.

Figure 5:
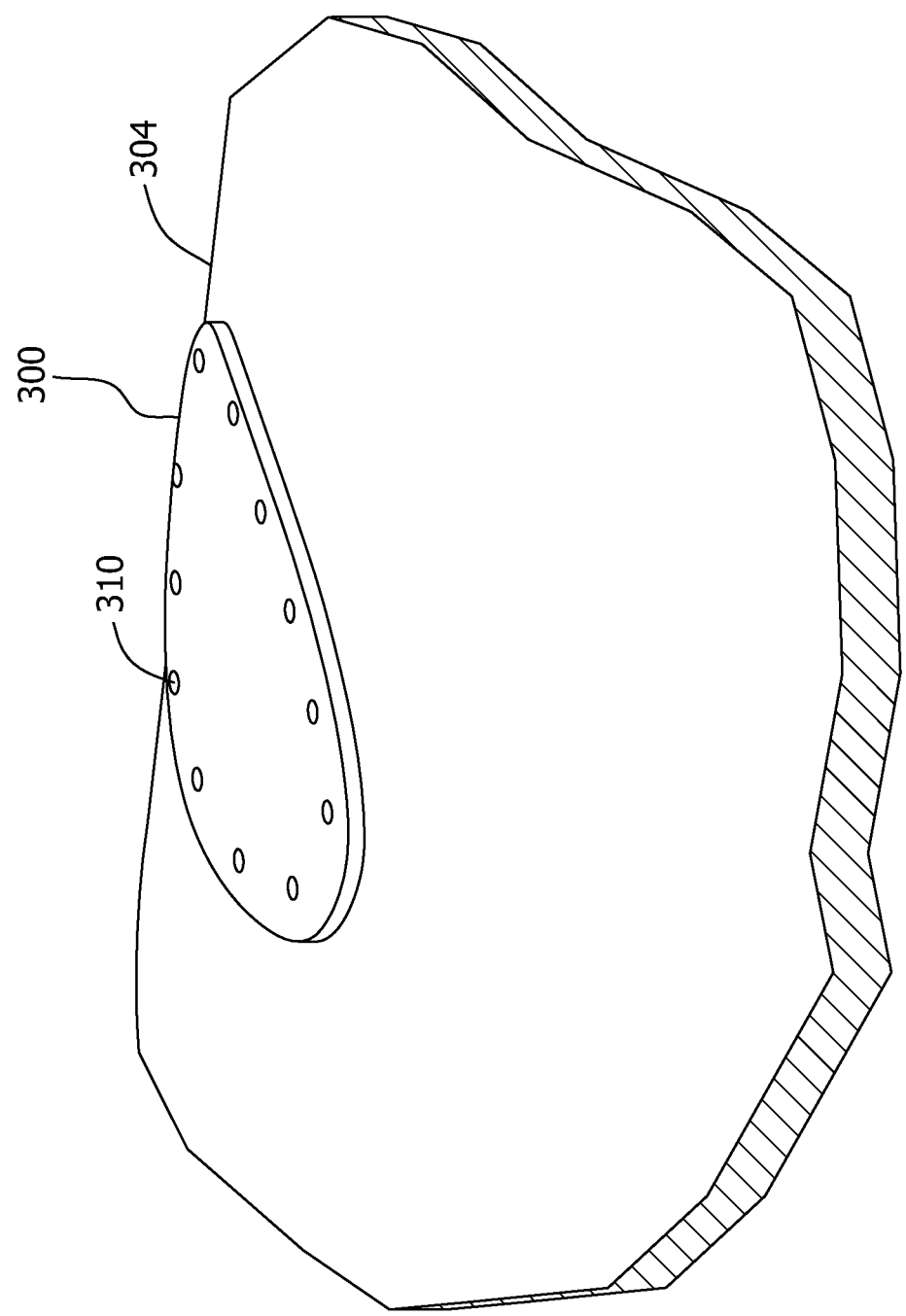
FIG. 5 is an illustration of the cover plate of FIG. 3 attached to a tank under test.
Figure 6:
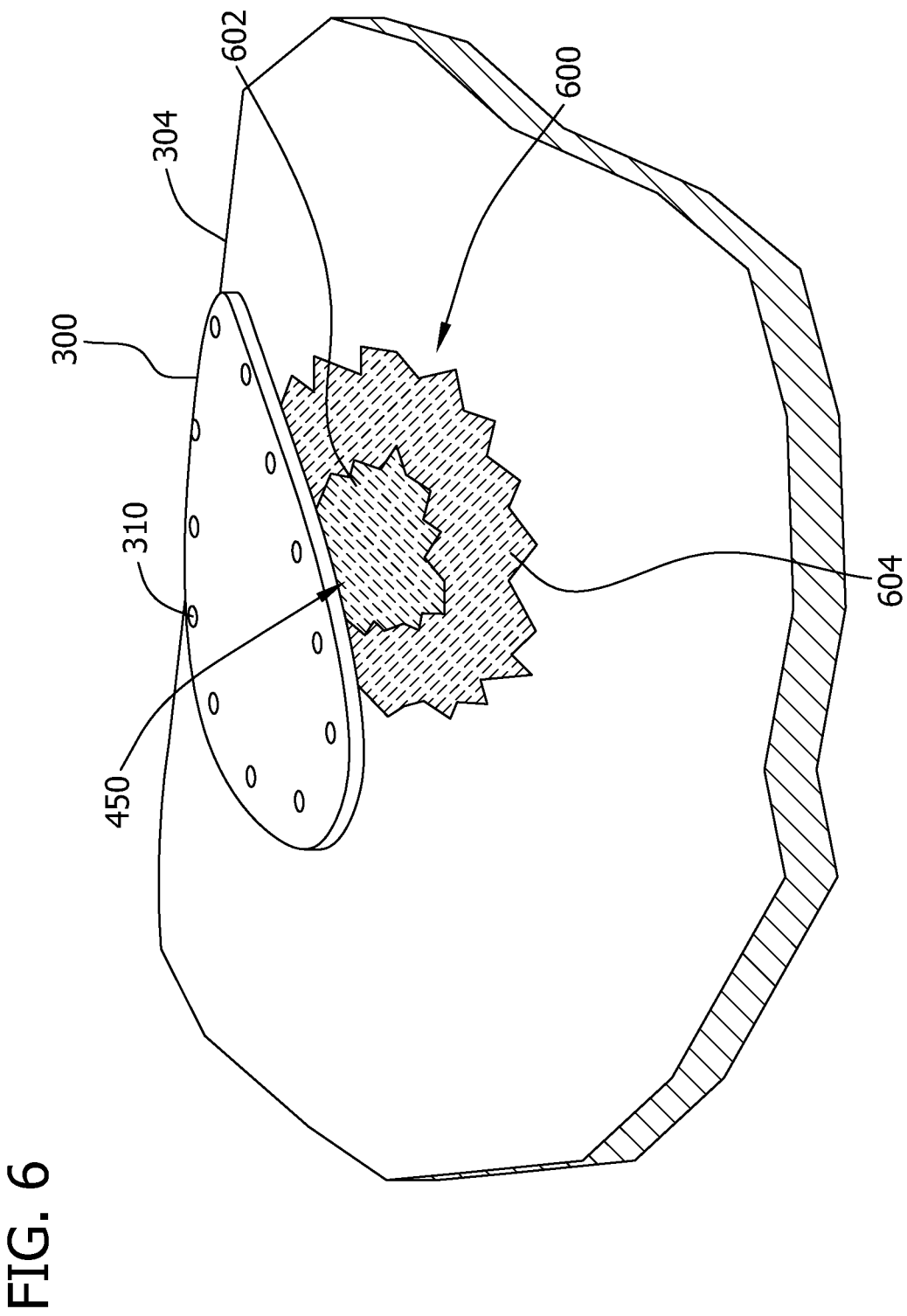
FIG. 6 is an illustration of the cover plate and tank under test of FIG. 5 illustrating a thermographic image when dehumidified air within the tank passes through a leak and mixes with air of an increased humidity.

FIG. 5 is a mock thermographic illustration of the cover plate 300 of FIG. 3 attached to tank under test 304 using a plurality of fasteners 310. The embodiment illustrated by FIG. 5 is an embodiment where thermographic camera 462 does not sense any evaporative cooling occurring in the vicinity of cover plate 300. On the other hand, FIG. 6 is a mock thermographic illustration of the cover plate 300 and tank 304 which includes a leak 450 (also shown in FIG. 4) which allows lower humidity air within the tank 304 to pass through leak 450 and mix with air of an increased humidity outside of the tank 304. The result, as described herein, is an area 600 of decreased temperature that has been sensed by thermographic camera 462. Area 600 may include several subareas within. For example, at an area closest to leak 450, an image 602 of a lower temperature area 602 may be surrounded by an image of an area 604 having a temperature between that of area 602 and that of the area surrounding area 604.

To further illustrate the thermographic illustrations of FIGS. 5 and 6, testing has been performed at various pressure differentials. For example, in one testing scenario a pressure differential between the exterior and interior of 6 psig (higher pressure in interior of tank being tested) resulted in a 0.6 degree C. temperature differential between a leakage area and the same area when not leaking as sensed by the thermal imaging system. The temperature differential was also 0.6 degree C. with a tank internal pressure of 4 psig. In further testing, the temperature differential was 0.5 degree C. with a tank internal pressure of 2 psig, 0.5 psig, and 0.25 psig. A temperature differential was able to be discerned with a tank internal pressure of less than 0.25 psig as compared to the environment external to the tank under test. For reference, the temperature of the tank leakage area (prior to the initiation of leak testing) was about 19.5 degrees C., and as described above, once the leakage initiated evaporative cooling, the temperature in the leakage area was consistently reduced below 19 degrees C. As the testing results above illustrate, the evaporative cooling process described herein provides a capability to visualize leaks in tanks, vessels, and cabins down to less than a 0.25 psi pressure differential as well as the capability to identify leakage areas down to 20 microns in size.

Known infrared thermographic leak detection relies on a temperature change at the leakage areas. This temperature change is brought about as a result of a velocity increase of the pressurized air passing through the leakage areas. Previous research however, has shown that in many cases the pressure differential across the vessel under test, results in a very low velocity change in the air passing through such a leak, resulting in a temperature difference that is below the typical infrared detector threshold of 0.1 degrees C. However, introduction of evaporative cooling to such a process, as described herein, allows for the sensing of temperature changes that occur, even at such a low velocity.

With the described embodiments, there is no need to use hazardous substances within a tank to be tested, or for the application of an indicator that reacts to the hazardous substance, and therefore no need for the subsequent removal of the indicator after testing of the tank. In addition, processes incorporating the described embodiments provide the ability to visualize leakage areas with a greater accuracy over tank testing processes than using helium and helium detectors. Helium and helium detectors only provide an approximation as to where leaks are located in a tank or other vessel. Further, the introduction of a humidity differential as described herein tends to reduce buildup of trapped moisture pockets within the vessel being tested. While described herein as using air with lower and higher humidity, embodiments which utilize gases other than air may be utilized, for example, nitrogen or other gases that can be humidified and dehumidified.

Evaporative cooling combined with infrared thermographic imaging does not use any hazardous substances or chemicals and has no ongoing material running costs as compared to anhydrous ammonia/indicator or helium/helium detector methods. Evaporative cooling combined with infrared thermographic imaging produces superior results in the time it takes to use the helium/helium detector method and can provide leak testing/indication in less time that it takes to carry out an anhydrous ammonia/indicator leak test.

Evaporative cooling combined with infrared thermographic imaging eliminates the ongoing use of hazardous chemicals, and thus eliminates most of the environmental impact that is found in other testing methodologies. In one example, detection is possible through the identification of 'made to measure' or modified air dehumidifiers upstream of the test article and the presence of infrared cameras.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for leak testing a commercial aircraft fuel tank, said method comprising:
   providing an environment within the fuel tank that is at a lower humidity than the environment surrounding the fuel tank, and that is at a pressure less than about 4 psi greater than a pressure of the environment surrounding the fuel tank by at least forming a quasi-closed loop in which air is drawn from the fuel tank, routed to a dehumidifier, and pumped back into the fuel tank; and
   using a thermographic imaging system to identify any leaks associated with the fuel tank by detecting any areas of decreased temperature resulting from evaporative cooling that occurs when a portion of the lower humidity environment escapes from the fuel tank and mixes with the higher humidity environment surrounding the fuel tank.

2. The method according to claim 1 wherein providing an environment within the fuel tank further comprises:
   increasing humidity of the air in the area surrounding the fuel tank.

3. The method according to claim 2 wherein increasing humidity of the air in the area surrounding the fuel tank comprises applying water to an exterior of the fuel tank.

4. The method according to claim 1 wherein providing an environment within the fuel tank comprises providing an environment within the fuel tank that is at a greater pressure than a pressure of the environment surrounding the fuel tank.

5. The method according to claim 4 wherein the pressure within the fuel tank is at least 0.25 psi greater than the pressure of the environment surrounding the fuel tank.

6. The method according to claim 1 wherein using a thermographic imaging system to identify any leaks within the fuel tank comprises identifying areas of lower temperature within a thermal image of a portion of the fuel tank.

7. The method according to claim 1 wherein using a thermographic imaging system to identify any leaks associated with the fuel tank comprises sensing a temperature drop caused by localized evaporation of moisture from external air proximate the leakage area.

8. A leak testing method comprising:
   pressurizing a commercial aircraft fuel tank to be leak tested to a pressure less than about 4 psi greater than a pressure of the environment surrounding the fuel tank with a gas having a humidity less than a gas surrounding the fuel tank by at least forming a quasi-closed loop in which air is drawn from the fuel tank, routed to a dehumidifier, and pumped back into the fuel tank;
   sensing any temperature drops proximate the fuel tank caused by localized evaporation of moisture from external gas using thermographic imaging; and
   identifying the temperature drops as leakages associated with the fuel tank.

9. The method according to claim 8 wherein sensing any temperature drops proximate the fuel tank caused by localized evaporation comprises sensing evaporative cooling that occurs when a portion of the lower humidity gas escapes from the fuel tank and mixes with the higher humidity gas surrounding the fuel tank.

10. The method according to claim 8 further comprising:
    increasing humidity of a gas in the area surrounding the fuel tank.

11. The method according to claim 10 wherein increasing humidity of a gas in the area surrounding the fuel tank comprises applying water to an exterior of the fuel tank.

12. The method according to claim 8 wherein pressurizing a fuel tank to be leak tested comprises providing at least one of:
    an environment within the fuel tank that is at a greater pressure than a pressure of the environment surrounding the vessel; and
    an environment within the fuel tank that is at a lower pressure than the environment surrounding the fuel tank.

13. The method according to claim 12 wherein the pressure differential between the pressure of the fuel tank and the pressure of the environment surrounding the fuel tank is at least 0.25 psi.

14. The method according to claim 8 further comprising identifying areas of lower temperature within a thermal image of a portion of the fuel tank.

15. A system for testing a commercial aircraft fuel tank for leakages, said system comprising:
    at least one device for providing a humidity differential between an inside of the fuel tank and the exterior of the fuel tank;
    a pump operable to provide a pressure differential of less than about 4 psi between the interior of the fuel tank and the exterior of the fuel tank; and
    a thermographic imaging system operable to identify any leaks associated with the fuel tank when the fuel tank is pressurized to less than about 4 psi, the leaks identifiable with said imaging system based on evaporative cooling that occurs when a portion of the lower humidity environment mixes with the higher humidity environment, wherein said at least one device, said pump, and said fuel tank are configured in a quasi-closed loop in which air is drawn from the fuel tank, routed to said at least one device, and pumped back into the fuel tank.

16. The system according to claim 15 wherein said thermographic imaging system comprises an infrared camera.

17. The system according to claim 15 wherein said thermographic imaging system comprises an image processing system operable for at least one of display and storage of images acquired by said thermographic imaging system.

18. The system according to claim 15 wherein said at least one device comprises a dehumidifier operable to reduce humidity either inside the fuel tank or surrounding the fuel tank.

19. The system according to claim 15 wherein said pump is operable for at least one of:
    increasing a pressure inside the fuel tank to provide the pressure differential between the interior of the fuel tank and the exterior of the vessel; and
    decreasing a pressure inside the fuel tank to provide the pressure differential between the interior of the fuel tank and the exterior of the fuel tank.

20. The system according to claim 19 wherein said pump is operable to create a pressure differential of at least 0.25 psi between the interior of the fuel tank and the exterior of the fuel tank.

* * * * *